United States Patent
Kaltenbach et al.

(10) Patent No.: US 8,475,331 B2
(45) Date of Patent: Jul. 2, 2013

(54) METHOD AND DEVICE FOR CONTROLLING A CREEP OPERATION OF A VEHICLE WITH A HYBRID DRIVE

(75) Inventors: Johannes Kaltenbach, Friedrichshafen (DE); Stefan Wallner, Mattsee (AT)

(73) Assignee: ZF Friedrichshafen AG, Friedrichshafen (DE)

( * ) Notice: Subject to any disclaimer, the term of this patent is extended or adjusted under 35 U.S.C. 154(b) by 372 days.

(21) Appl. No.: 12/808,638

(22) PCT Filed: Dec. 2, 2008

(86) PCT No.: PCT/EP2008/066572
§ 371 (c)(1),
(2), (4) Date: Nov. 4, 2010

(87) PCT Pub. No.: WO2009/086995
PCT Pub. Date: Jul. 16, 2009

(65) Prior Publication Data
US 2011/0048822 A1  Mar. 3, 2011

(30) Foreign Application Priority Data
Dec. 17, 2007 (DE) .......................... 10 2007 055 825

(51) Int. Cl.
*B60W 20/00* (2006.01)

(52) U.S. Cl.
CPC .................................... *B60W 20/00* (2013.01)
USPC ......................... 477/5; 180/65.25; 180/65.265

(58) Field of Classification Search
CPC ..................................................... B60W 20/00
USPC ................. 180/65.21, 65.25, 65.265, 65.275, 180/65.285; 903/930, 946; 477/5, 6, 8, 167, 477/168, 176; 701/22, 51, 67, 68
See application file for complete search history.

(56) References Cited

U.S. PATENT DOCUMENTS 2,616,310 A * 11/1952 Jandasek .......................... 477/62
4,070,927 A    1/1978 Polak
(Continued)

FOREIGN PATENT DOCUMENTS

DE    2721719 A1   12/1977
DE   10158536 A1    7/2003
(Continued)

OTHER PUBLICATIONS

International Search Report for International Application No. PCT/EP2008/066572, dated Mar. 23, 2009, 2 pages.
(Continued)

*Primary Examiner* — J. Allen Shriver, II
*Assistant Examiner* — Jacob Meyer
(74) *Attorney, Agent, or Firm* — Brinks Hofer Gilson & Lione

(57) ABSTRACT

The invention relates to a method and device for controlling a creep operation of a vehicle with a hybrid drive (1), comprising a parallel hybrid drivetrain (2), with an internal combustion engine (3), at least one electric motor (5), a first switching element (4) in the form of a friction element between the internal combustion engine (3) and the electric motor (5), a gearbox (7), an output (26) and a second switching element (6) arranged between the electric motor (5) and the output (26). According to the invention, a simple, effective and component-friendly continuous creeping can be achieved without additional constructional or economic costs can be achieved, wherein the creeping operation is carried out with the internal combustion engine (3) running and both switching elements (4,6) simultaneously operating with slip, wherein the total operating power required to generate a required creeping torque is variably distributed over both switching elements (4, 6).

9 Claims, 2 Drawing Sheets

U.S. PATENT DOCUMENTS

| | | | |
|---|---|---|---|
| 4,741,422 A | | 5/1988 | Fuehrer et al. |
| 5,719,768 A | * | 2/1998 | Tashiro et al. .................. 701/67 |
| 5,779,595 A | * | 7/1998 | Kono et al. .................... 477/174 |
| 6,077,186 A | * | 6/2000 | Kojima et al. ..................... 477/3 |
| 6,098,584 A | * | 8/2000 | Ahner et al. ............... 123/179.3 |
| 6,132,336 A | * | 10/2000 | Adachi et al. ................. 477/169 |
| 6,166,517 A | * | 12/2000 | Wakashiro et al. ........... 320/104 |
| 6,342,027 B1 | * | 1/2002 | Suzuki ............................... 477/5 |
| 6,502,652 B2 | * | 1/2003 | Rogg ......................... 180/65.21 |
| 6,510,370 B1 | * | 1/2003 | Suzuki et al. .................... 701/22 |
| 6,565,483 B2 | * | 5/2003 | Segawa et al. ................. 477/174 |
| 6,785,598 B2 | * | 8/2004 | Schiele ............................ 701/51 |
| 6,808,470 B2 | * | 10/2004 | Boll .................................. 477/6 |
| 7,160,225 B2 | * | 1/2007 | Berger et al. ...................... 477/5 |
| 7,174,980 B2 | * | 2/2007 | Hoetzer et al. ............ 180/65.245 |
| 7,377,344 B2 | * | 5/2008 | Barske ....................... 180/65.28 |
| 7,644,790 B2 | * | 1/2010 | Roske et al. ............... 180/65.22 |
| 7,762,922 B2 | * | 7/2010 | Dreibholz et al. ................. 477/5 |
| 7,770,676 B2 | * | 8/2010 | Tenbrock et al. ........ 180/65.285 |
| 7,878,281 B2 | * | 2/2011 | Tanishima ............... 180/65.265 |
| 7,892,139 B2 | * | 2/2011 | Kaltenbach ....................... 477/5 |
| 8,065,047 B2 | * | 11/2011 | Hasegawa et al. ............... 701/22 |
| 8,109,856 B2 | * | 2/2012 | Kaltenbach ....................... 477/5 |
| 8,113,309 B2 | * | 2/2012 | Allgaier ................... 180/65.265 |
| 8,167,066 B2 | * | 5/2012 | Joos et al. ................ 180/65.265 |
| 8,251,165 B2 | * | 8/2012 | Katsuta et al. ........... 180/65.265 |
| 8,281,885 B2 | * | 10/2012 | Zettel et al. ............. 180/65.285 |
| 2002/0117339 A1 | * | 8/2002 | Nakashima .................. 180/65.4 |
| 2003/0010548 A1 | * | 1/2003 | Mesiti et al. ................. 180/65.2 |
| 2003/0153429 A1 | * | 8/2003 | Boll .................................. 477/6 |
| 2004/0121882 A1 | * | 6/2004 | Tajima et al. ..................... 477/3 |
| 2004/0127327 A1 | * | 7/2004 | Kahlon et al. .................... 477/5 |
| 2005/0153815 A1 | * | 7/2005 | Janssen ........................... 477/62 |
| 2005/0155803 A1 | * | 7/2005 | Schiele ....................... 180/65.2 |
| 2005/0221947 A1 | * | 10/2005 | Mesiti et al. ...................... 477/5 |
| 2006/0048988 A1 | * | 3/2006 | Dreibholz et al. ............ 180/213 |
| 2006/0266568 A1 | * | 11/2006 | Barske ........................ 180/65.2 |
| 2006/0272869 A1 | * | 12/2006 | Hidaka et al. ............... 180/65.2 |
| 2007/0207892 A1 | * | 9/2007 | Dreibholz et al. ................. 477/8 |
| 2007/0246273 A1 | * | 10/2007 | Tenbrock et al. ............ 180/65.2 |
| 2007/0272456 A1 | * | 11/2007 | Shiiba ......................... 180/65.2 |
| 2007/0275819 A1 | * | 11/2007 | Hirata ............................... 477/5 |
| 2007/0278022 A1 | * | 12/2007 | Tanishima .................. 180/65.2 |
| 2008/0058154 A1 | * | 3/2008 | Ashizawa et al. ................. 477/5 |
| 2008/0305921 A1 | * | 12/2008 | Falkestein ......................... 477/3 |
| 2009/0299591 A1 | * | 12/2009 | Broeckel et al. ................. 701/70 |
| 2009/0308673 A1 | * | 12/2009 | Seel ........................... 180/65.22 |
| 2011/0039655 A1 | * | 2/2011 | Kaltenbach et al. .............. 477/5 |
| 2011/0040432 A1 | * | 2/2011 | Kaltenbach et al. ............ 701/22 |
| 2011/0045947 A1 | * | 2/2011 | Kaltenbach et al. .............. 477/5 |

FOREIGN PATENT DOCUMENTS

| | | |
|---|---|---|
| DE | 102005051382 A1 | 5/2007 |
| EP | 0282169 A1 | 9/1988 |
| EP | 1862364 A1 | 12/2007 |

OTHER PUBLICATIONS

Written Opinion of the International Searching Authority for International Application No. PCT/EP2008/066572, dated Mar. 23, 2009, 8 pages.

International Search Report for International Application No. PCT/EP2008/066572, dated Jul. 6, 9 pages.

* cited by examiner

METHOD AND DEVICE FOR CONTROLLING A CREEP OPERATION OF A VEHICLE WITH A HYBRID DRIVE

This application is a filing under 35 U.S.C. §371 of International Patent Application PCT/EP2008/066572, filed Dec. 2, 2008, which claims priority to German Application No. 10 2007 055 825.4, filed Dec. 17, 2007, each of which is incorporated by reference herein in its entirety.

TECHNICAL FIELD

The invention relates to a method and apparatus for controlling a creeping operation of a vehicle with a hybrid drive.

BACKGROUND

Hybrid drives gain in importance in the vehicle manufacturing because of their potential to cut emissions and energy consumption. Such cars have various power sources, with combinations of internal-combustion engine and electric motors being particularly advantageous, because they can utilize, on the one hand, the range and performance advantages of internal-combustion engines and, on the other, the flexible applications of electrical machines as a sole or auxiliary power source or as a starter generator to produce electricity and ensure recuperation.

The market demands hybrid drive trains, which can be implemented into vehicles without additional space requirements, while minimizing the complexity and at low cost and design effort. In principle, we distinguish two hybrid topologies: the series hybrid and the parallel hybrid versions. Such arrangements are already known and are constantly further developed.

In the series hybrid, drive units are connected in series. Here, it is the internal-combustion engine, such as a diesel engine, that drives a generator, which then feeds an electric machine. The vehicle is thus driven solely by the electric machine. The internal-combustion engine, however, is decoupled from the drive wheels and can therefore be run always in a single operating point, i.e., at a given torque and constant speed. This drive concept is suitable, for example, for short journeys in urban buses, with the operating point preferably set to such level, at which the efficiency of the combustion engine is as high as possible while emissions, fuel consumption and noise lie in a favorable range. An unfavorable aspect of the series hybrid is, however, that the efficiency of the drive is limited because of the multiple electrical-mechanical energy conversion.

In contrast, by their parallel arrangement of the power flow through the power train unit and the superposition of the driving moments, hybrid power trains offer the possibility of driving the vehicle by purely internal-combustion engine or by purely electric-motor drive. Functionally, in a parallel hybrid, the combustion engine can be operated largely with an optimum torque due to the burden and/or support by one or more electrical machines so that the maximum efficiency point of the combustion engine can effectively be used. The electrical assistance to the combustion engine reduces on average fuel consumption. Since during short-term increased power demands in the so called boost mode, for example, when overtaking, a summation of the drive power is possible, the internal-combustion engine can be designed relatively small, saving weight and installation space with almost no loss of performance and driving comfort of the vehicle, which in turn reduces emissions and lowers cost. In addition, the electric machine can also act as an integrated starter generator (ISG) to start the internal-combustion engine via a coupling. Furthermore, the electrical machine in generator mode can be used to charge an electrical energy storage device and to recuperate energy when the vehicle is braking. In principle, all types of vehicle transmissions can be considered for the purpose of variation of translations of the drive.

In a parallel hybrid drive, depending on the particular hybrid operation strategy, one can switch during the actual driving between the internal-combustion engine drive, electromotor drive or mixed drive. The changing connection of the electric motor and the combustion engine is usually implemented using clutches. We distinguish two-clutch arrangements (2C) and one-clutch arrangements (1C), where with both concepts, the electric motor can act as an integrated starter generator (2C-ISG or 1C-ISG arrangement). In a 2C-ISG power train, such as the one known from US 2005 022 1947 A 1, the internal-combustion engine can be connected, via a first clutch, to the electric motor. In turn, the electric motor is coupled via a separate second clutch to a vehicle transmission. In a 1C-ISG power train, as it is known for example from the DE 10 2005 051 382 A1, however, a second separate clutch between the electric motor and the gearbox or the output is eliminated. The electric machine can then be directly connected to the transmission. The function of an optional second clutch between the electric motor and the output may, where in the respective drive system provided or required, can also by assumed by any gear-box internal clutches and/or switching brakes, as they are built in, for example, automatic transmissions, or by a torque converter clutch arranged upstream the gearbox.

It is also known to implement a creep mode in vehicles with automated transmissions or automatic transmissions to increase the ride comfort and the operation reliability in the control and regulation of the vehicle. In this arrangement, a creeping moment is transmitted from the drive to output or to the driven vehicle wheels, while this creeping moment can be adjustable to a predetermined characteristic value or characteristic. In such an operating mode, the vehicle is moving, with a set gear ratio, a non-actuated brake and non-actuated accelerator pedal, with very low speed. On slopes, one can perform a temporary and limited stop operation using the creep mode.

Depending on the drive concept, a creep mode can be implemented and controlled in the drive train in different ways. In conventional vehicles with an automated gearbox and an automatic frictionally engaged clutch, the creep mode can be realized by appropriate control of the starting clutch. With other conventional vehicles with automatic transmissions and a hydrodynamic torque converter, a creep moment produced by the torque converter is primarily determined by the idling speed of the internal-combustion engine. For hybrid or electric vehicles, as an alternative to conventional friction clutches or hydrodynamic torque converters, an existing electric propulsion device can also be sued to produce a creep mode.

Compared to a power train with a frictional clutch, which is operated in creep mode in order to transmit the creeping, such electrical creeping operation has, in principle, the advantage of lower mechanical losses incurred in power transmission. It also eliminates the risk of overheating the clutch. It therefore seems to be obvious in a hybrid vehicle to use a purely electric creep generated by the electric machine when the internal-combustion engine is running at idle and is uncoupled from the power train.

It is however problematic that the electrical drive energy storage device of the hybrid vehicle can empty itself with the electric motor operating as the driving motor in a relatively short period of time so far that the creeping operational mode must be stopped or interrupted in order to load the energy storage device in the generator mode of the electric machine. Thus, the electric machine would temporarily not be available to drive the vehicle and, where appropriate, to supply additional appliances. Therefore, a permanent electric motor creeping in a hybrid vehicle is to be assessed as a non-optimal solution. On the other hand, in the case of a permanent creeping through a slip clutch there may arise high power losses in it that require an appropriate construction size with increased space requirements and additional weight as well as a relatively expensive cooling system.

DE 101 58 536 B4 discloses a drive for an electric or hybrid vehicle, in which an operational creeping is realized by means of an electric drive unit. In the power train of the vehicle, a clutch device is arranged between the electric motor and an output of a clutch device. The clutching device may, for example, be designed as a direct-drive clutch, which technically precedes an automatic transmission. Alternatively, one or more clutches and/or switching brakes of an automatic transmission can function as the said coupling device. To reduce the thermal load on the electric motor in the creep mode at high torque requirements, such as when the vehicle is crawling or stopping at slopes, or when driving over curbs, and at the same time to avoid major dimensions of the electrical machine and/or the coupling device, there can be operated a clutch of the clutch device in the creep mode parallel to the motor operation of the electric motor as necessary. If the output side of the clutch device comprises multiple clutches, they may also be used alternately or in addition the creep mode. If the electric machine comprises two separate excitable windings, then these can be operated in constant change. A combination of these means or measures can avoid a thermal overload of both the coupling device (clutch) and the electric machine at high driving torques at very low speeds or with a high permanent static torque. A disadvantage of this is that during the permanent creeping the electric machine is continuously driven by the motor for a relatively long period. It is true that the electric machine can be supported by the transmission-side coupling device and /or by the several excitable windings that are controllable in a changing mode. The relatively intensive use of the electric energy storage drive of the electric machine can, however, still significantly restrict such a permanent creeping operation. In addition, an electrical machine with several separate windings may also be relatively expensive to manufacture. In addition, the complete abandonment of the operation of the combustion engine during the permanent creeping with a hybrid drive is rather ineffective.

Against this background, the technical task of the invention is to provide a method and an apparatus for controlling a creeping operation of a vehicle with a hybrid drive that allows to create a simple, effective and design-saving permanent creeping without any additional construction cost.

BRIEF SUMMARY

The solution of this problem becomes apparent from the features of independent claims, whereas advantageous embodiments and further developments of the invention can be derived from dependent claims.

The invention is based on the recognition that in a hybrid vehicle, in which between a combustion engine and an electric motor, a first frictional shifting component and between the electric motor and an output, a second frictional shifting component are provided, through a joint use of both frictional elements in the slip operation a permanent creeping is feasible, which, on the one hand, generates a desired creeping moment and, on the other, causes that neither one of the two shifting components become unduly loaded nor a larger sizing of one of the two shifting components is required nor does it imply a greater use of the electric machine.

Accordingly, the invention according to the features of claim 1 is based on a method for controlling a creeping operation of a vehicle with a hybrid drive, with a parallel hybrid power train, comprising a combustion engine, at least one electric machine, a first shifting component that is arranged between the combustion engine and the electric motor and is designed as a friction component, a transmission, an output and a second shifting component between the electric motor and the output that is designed as a frictional component.

Under a creeping operation of a vehicle with an internal combustion engine and a transmission gear is understood that with an engaged transmission gear and a non-actuated accelerator, the vehicle is moving with such a low speed or is temporarily held to a stop that it comprises a positive connection between the combustion engine and an output accompanied by a drop in speed of the engine under its idle speed.

Under a frictional component, we understand a frictional force-transmitting shifting component having at least two friction pairs, where a fully engaged shifting component causes a frictional contact and in a slipping operation there exists a rotational difference between the primary and the secondary friction bodies, with friction energy being converted into heat.

To solve the given task, according to claim 1 the invention provides that to realize the creeping operation with running internal combustion engine, both shifting components are simultaneously operated in a slipping operation, where the overall frictional output that is required to generate a desired creeping moment, is variably distributed to the two shifting components.

The given task is also solved by a device for carrying out the method.

Accordingly, the invention is further based on an apparatus for controlling a creeping operation of a vehicle with a hybrid drive, with a parallel hybrid power train, comprising a combustion engine, at least one electric machine, a first shifting component that is arranged between the combustion engine and the electric motor and is designed as a friction component, a transmission, an output and a second shifting component between the electric motor and the output that is designed as a frictional component. In addition, control means for realizing the creeping operation with running internal combustion engine are provided, by means of which both shifting components are simultaneously operated in a slip operation, where the overall frictional output that is required to generate a desired creeping moment, is variably distributed to the two shifting components.

The second shifting component can be designed as a friction clutch that is arranged between the electric motor and the gearbox. Alternatively, the second shifting component can be designed as a friction clutch or friction brake inside the transmission. This may possibly eliminate an external second bracket, which is a space-saving and cost-effective aspect. In principle, several clutches and/or brakes inside the transmission, which act in combination as the second shifting component, are also possible.

The invention can be sued particularly advantageously in combination with a transmission that is designed as a planetary gear train with several, for example three, planetary gears sets, wherein the said second shifting component is designed as one consisting of at least two clutches, or as one consisting of at least three shifting brakes. Such a transmission and its function by themselves are known to a person skilled in the art. As an example, we wish to refer to the DE 27 21 719 A1 and EP 0 282 169 B1.

The invention proposes, in a creeping operation of the hybrid vehicle operation through friction forces to generate a desired creeping moment, to use two slipping clutches together and to split the resulting friction torque to the two slipping clutches as required. This allows to create a virtually unlimited permanent creeping operation while avoiding the risk of overheating of the clutch. Since this design eliminates a shifting control of the clutches, the control and regulation of the creeping operation becomes relatively simple. In addition, the creeping operation is also very comfortable because load changes caused by switching or switching back and forth between the individual drive components are eliminated.

The distribution of the overall friction output to the two shifting components can be performed simply by means of a speed control of the electric machine, through which the power dissipation of the shifting components that is correlated with individual friction moments are set, wherein the electric machine speed varies in a speed range between a transmission input speed as a lower limit and a combustion engine speed as an upper limit.

The electrical machine speed to generate a power dissipation on the first shifting component that is smaller compared to the second shifting component, is operated in the speed range close to the combustion engine speed, and to generate a power dissipation on the second shifting component that is smaller compared to the first shifting component, the electric machine is operated in the speed range close to the transmission input speed.

For clarification in view of the different implementation options of the second shifting component as either outside the transmission or inside it, it should be noted regarding the definition of the transmission input in the context of the invention:

Under a transmission input we understand a shaft operatively connected with the output side of the second shifting component. A transmission input speed is therefore the speed of the shaft that is operatively connected with the output end of the second shifting component. Thus, with a separate friction clutch as the second shifting component that is arranged upstream of the gearbox, the transmission input speed can thus be space-wise picked up before the transmission. With a friction component inside the transmission as the second shifting component, the transmission input speed can be picked up on the secondary side of the shifting component, i.e., inside the transmission.

Particularly advantageous is a to split the overall friction output to the two clutches, where, for example, a respective cooling is taken into account so that the lowest possible temperature level can be ensured on the two clutches that saves their wear and tear. In principle, other and additional more relevant shifting component-specific aspects, such as the clutch size, type and design of the friction pairs, etc., or their derivative sizes of the various shifting components are used as set-up criteria.

Another possibility is the monitoring of the temperature of clutches and, possibly, other current operating conditions, or any parameters derived thereof, such as a condition of wear, oil temperature, etc. so that, depending on the actual clutch temperature, with an uneven clutch warming, the distribution of the friction can be adjusted.

In a preferred embodiment of the process, the implementation of the permanent creeping operation is done in at least two phases:

a) Start of the permanent creeping operation by accelerating the electric motor to a medium speed in the speed range between zero and an idle speed of the combustion engine, based on stationary vehicle with an engaged gear with at least open first shifting component and the combustion engine running at idle, and
b) Introduction of the permanent creeping operation by generating a desired creeping moment through moment-regulated control of both shifting components in the slip and by splitting the overall friction output required to produce the desired creeping to the two shifting components by setting the speed of the electric machine in a speed range between the transmission input speed that is correlated with a current creeping speed and the current combustion engine speed.

Subsequently, to start the creeping operation, with a stationary vehicle with the gear engaged, first the electric motor is accelerated to a speed with enough distance between zero and the idle speed of the combustion engine and the two clutches are brought to slip so that a predetermined desired creeping is generated at the output and the vehicle begins to creep. In the creeping operation the transmitted torque of the clutch on the side of the combustion clutch is controlled in the slip. The electric machine runs at a speed between a transmission input speed, which results from the current creep speed and the engaged gear, and the combustion engine speed. With a variation of the electric machine speed, one influences the power dissipation of the clutches, depending on their cooling capacities, through the current speed difference of the friction pairs of the shifting components. Furthermore, the transmitted torque transmitted of the output-side clutch or shifting brake in controlled the slip. In the steady creeping operation, i.e., when the torque control of the clutches and the speed control of the electric machine are coordinated, a stable operating point of the vehicle drive in a permanent creeping operation is set up.

BRIEF DESCRIPTION OF THE DRAWINGS

To illustrate the invention, a drawing is included in the description of an embodiment. This shows

DETAILED DESCRIPTION

Figure 1:
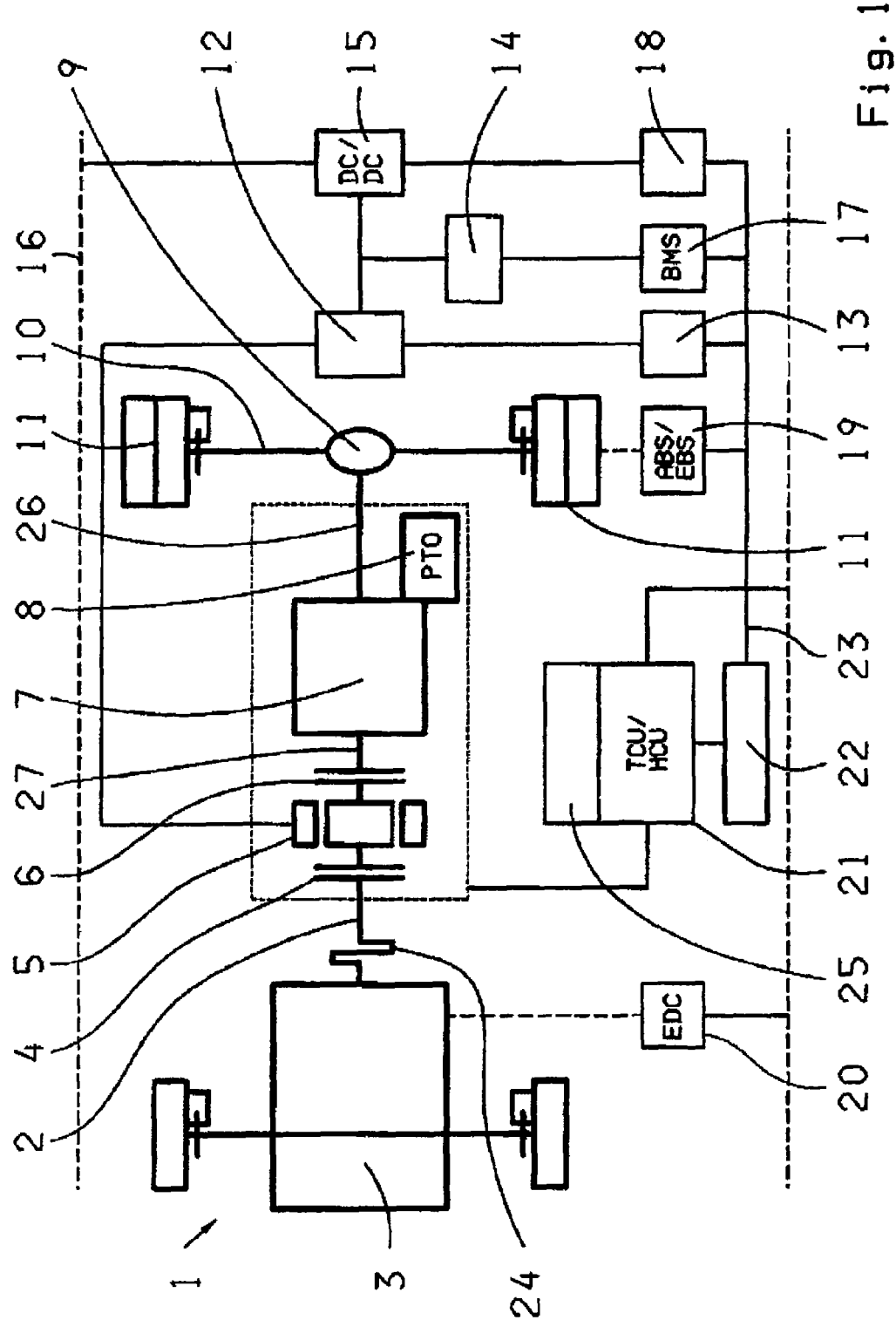
FIG. 1 shows a schematic representation of a hybrid drive of a vehicle for the implementation of an inventive method for controlling a creeping operation.

FIG. 1 represents a diagram of a hybrid vehicle drive 1 with a parallel hybrid power train 2, as it can be used, for example, in a commercial vehicle (truck, bus, special vehicle). The drive train 2 has an internal combustion engine 3, for example, a diesel engine with a crankshaft 24, which can be connected to an electric motor 5 via a shifting component 4 that is designed as a friction clutch. The electric machine 5 can, in turn, be coupled—via a second shifting component 6 that is designed as a friction clutch—with a transmission input 27 of the transmission 7. The function of the second shifting component 6 can be assumed, as already mentioned above, by (not shown) coupling components arranged inside the transmission, in particular one or more clutches and/or switching brakes of a suitably designed transmission, for example, a tri-element planetary gear train. The transmission 7 can be followed, as indicated in FIG. 1, by a non-described power take-off (PTO) 8 as a subordinate drive technology. Over a drive 26 and a differential output 9, an output torque of the hybrid drive can be transmitted to a drive axle 10 and, though this, then forwarded to the drive wheels 11.

Depending on the operating situation, the electric machine 5 may be operated as an electric drive unit or as a generator. For this purpose, it is connected to a converter 12, which is controlled by an inverter control unit 13. By means of the inverter 12, the electrical machine 5 is connected with an electric energy storage drive 14, for example, a 340V high-voltage battery (supercaps are also possible). When in its motor operation, the electric motor is fed energy from the energy storage device 14. In its generator mode, i.e., when driving through the combustion engine 3 and/or in the recuperation operation, the energy storage device 14 is being charged by the electric motor 5. Furthermore, the electric motor 5 acts as an integrated starter generator (ISG) to start the combustion engine 3. The high-voltage circuit of the energy storage device 14 and/or the connected control units are connected to a vehicle electrical system 16 (24V or 12V) via a bi-directional DC/DC 15. The energy storage device 14 is monitored and controlled by a battery management system (BMS) 17 with respect to its state of charge (SOC). The DC 15 is controlled by a DC-control unit 18. Moreover, a control unit 19 for unspecified brake control functions, in particular an anti-lock brake system (ABS) or an electronic braking system (EBS) and another control unit 20 for an electronic diesel control (EDC) of the provided combustion engine 3 designed, for example, as a diesel engine. The various above-mentioned control units can also be integrated at least in part, in a single a control unit.

Furthermore, an integrated control device 21 is provided, which integrates a transmission control unit (TCU), a hybrid control unit (HCU) and various operational functions in the form of electronic control and/or regulation programs. According to the invention, to the control device 21 there are assigned control means 25 to control the shifting components 4 and 6 for their slip mode. For this purpose, the control means 25 are designed to that they act in coordination with the control device 21, which also controls the operation of the electrical machine 5, in the regulation of an inventive creeping operation with two shifting components 4, 6 in the slip operation and speed control of electric machinery 5. A central strategy unit 22 is provided to control and switch the possible drive modes of the hybrid drive, which is advantageously connected via a data bus (e.g., CAN) 23 with the control device 21 and the control unit 25 and the other relevant control devices 13, 17, 18, 19.

An inventive method for the operational implementation of a creeping mode that can be particularly effectively with the hybrid drive 1, is based on that the two shifting components 4, 6 are simultaneously operated in the slip. First, the vehicle is at a standstill with the combustion engine 3 running at idle speed. The friction clutch 4 on the side of the combustion engine is open so that the combustion engine 3 is decoupled from the drive power train 2. The speed of the electric machine 5 is zero. In the transmission 7, a starting gear is engaged. To start the creep of the vehicle, the electric machine 5 is accelerated to a speed higher than the idle speed. The second shifting component 6 can also be initially open or from the start, is accelerated, preferably in a creep operation. After the starting phase, two friction clutches 4, 6 are operated in the slip mode so that at a desired creeping moment is generated at the output 26 and the vehicle is then moving at a crawling speed depending on the transmission ratio engaged.

Figure 2B:
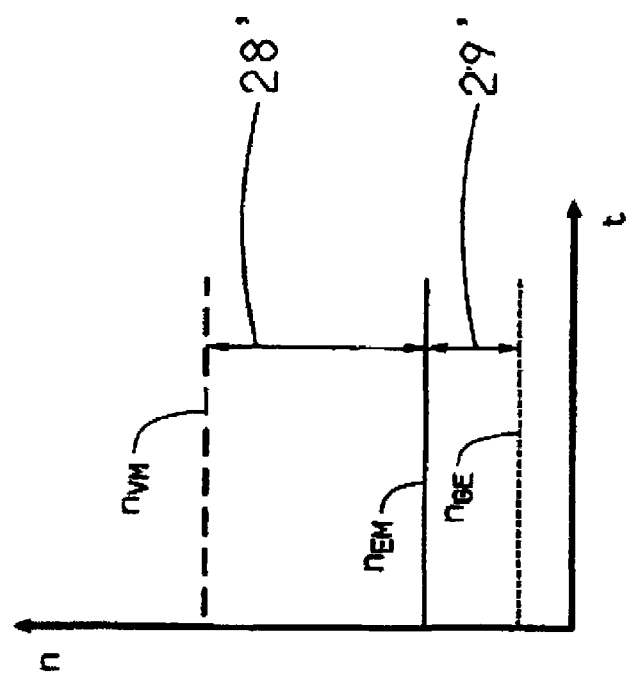
FIG. 2 shows a speed chart for friction output distribution to two clutches during the creeping operation.
Figure 2A:
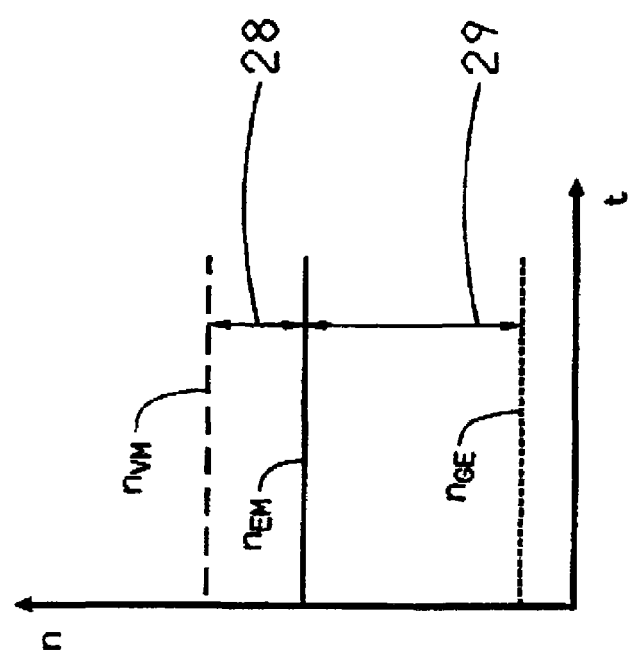

The overall friction output of the two clutches 4, 6, which is correlated with the generated creeping moment, can split to the two clutches 4, 6 by means of a speed control of the electric machine 5. FIG. 2 shows a simplified diagram of the with rotational speed of the combustion engine 3, the electric machine 5 and the transmission input 7. In the operation variant shown in FIG. 2a, the electrical machine speed $n_{EM}$ is set up near the rotational speed of the combustion engine $n_{VM}$. A difference of the speed 28 between the speed of the combustion engine 3 and that of the electric machine 5 is thus smaller than an speed difference 29 between the speed of the electric motor 5 and the speed of the transmission input 27. Conversely, in the operation variant shown in FIG. 2b, the electric machine speed $n_{EM}$ is set up closer to the transmission input speed $n_{GE}$. A speed difference 29' between the speed of the electric machine 5 and the speed of the transmission input 27 is thus lower than the speed difference 28' between the speed of the electric machine 5 and the speed of the combustion engine 3.

From the slip that corresponds to the speed differences 28, 29 or 28', 29' then result different force dissipation due to the frictional energy input into the two clutches 4, 6. In practical creeping operation, the power dissipation at the two clutches 4 and 6 is set up by means of a speed control of electric machine 5, depending on their given cooling capacity, so that the lowest possible heating develops at the two clutches 4, 6 so that the creeping operation can be sustained permanently without the risk of clutch damage.

LIST OF REFERENCE NUMBERS AND SYMBOLS

1 A hybrid drive
2 Power train
3 Combustion engine
4 First shifting component
5 Electric machine
6 Second shifting component
7 Transmission
8 Power take-off
9 Differential
10 Drive shaft
11 Vehicle wheel
12 Inverter
13 Inverter control
14 Electrical energy storage device
15 DC converter
16 Vehicle electrical wiring
17 Battery Management System
18 Voltage converter controller
19 Electronic braking control
20 Electronic Diesel Control
21 Control device
22 Operating Strategy Unit
23 Data bus
24 Crankshaft
25 Means of control
26 Output
27 Transmission input
28, 28' Speed difference
29, 29' Speed difference
ABS Anti-lock braking system
BMS Battery management system
DC/DC Direct Current/Direct Current converter
EBS Electronic Brake System
EDC Electronic Diesel Control
HCU Hybrid Control Unit
TCU Transmission Control Unit
PTO Power Take-Off
n Rotational speed
$n_{EM}$ Rotational speed of the electric machine $n_{GE}$ Rotational speed of the transmission input
$n_{VM}$ Rotational speed of the combustion engine
t Time

The invention claimed is:

1. A method for controlling a creeping operation of a vehicle with a hybrid drive, with a parallel hybrid drive train, comprising an internal combustion engine, at least one electric motor, a first shifting component designed as a frictional component that is arranged between the combustion engine and the electric motor, a transmission, an output and a second shifting component designed as a frictional component that is arranged between the electric motor and the output, characterized in that to realize the creeping operation with running internal combustion engine, the two shifting components are simultaneously operated in slip operation, with an overall friction output that is required to produce a desired creeping moment is variably distributed to the two shifting components, wherein the distribution of the overall friction output to the two shifting components is performed using a rotational speed control of the electric motor, by means of which the power dissipating moment of the shifting components, which are correlated with the individual frictional moments, are set, with the electrical motor speed ($n_{EM}$) is varied in a speed range between a transmission input speed ($n_{GE}$) as a lower limit, and a combustible engine speed ($n_{VM}$) as an upper limit.

2. The method according to claim 1, characterized in that the rotational speed of the electric motor ($n_{EM}$) is set up to run in the speed range close to that of the combustion engine speed ($n_{VM}$) to generate a smaller power dissipation on the first shifting component compared to the second shifting component, and in a speed range close to that of the transmission input speed ($n_{EM}$) to generate a smaller power dissipation on the second shifting component compared to the first shifting component.

3. The method according to claim 1, characterized in that in the distribution of the overall friction output to the two shifting components, a respective pertinent cooling capacity or other pre-determined relevant shifting component parameters or derived sizes of the individual shifting components are taken into account.

4. The method according to claim 1, characterized in that in the distribution of the overall friction output to the two shifting components, the current temperature of the clutch or other actual operation states or the derived sizes of the individual shifting components are taken into account.

5. The method according to claim 1, characterized in that at least the following steps are provided for the implementation of a permanent creeping operation:
    a) Starting of the permanent creeping operation by accelerating the electric motor to a medium speed of the electric motor ($n_{EM}$) in a speed range between zero and an idle speed of the internal combustion engine, with the vehicle at standstill with an engaged gear with at least open first shifting component and the idle running internal combustion engine;
    b) Launching a permanent creeping operation by:
        The generation of a desired creeping moment by torque-based control of the two shifting components in the slip, and
        The distribution of the overall friction power that is required to reach the desired creeping moment to the two shifting components by setting the speed of the electric motor ($n_{EM}$) in a speed range between a transmission speed that is correlated with the current creeping speed and the actual combustion engine speed.

6. An apparatus for controlling a creeping operation of a vehicle with a hybrid drive, with a parallel hybrid drive train, comprising an internal combustion engine, at least one electric motor, a first shifting component designed as a frictional component that is arranged between the combustion engine and the electric motor, a transmission, an output and a second shifting component designed as a frictional component that is arranged between the electric motor and the output, characterized in that a control means to realize the creeping operation with running internal combustion engine are provided, by means of which the two shifting components are simultaneously operated in slip operation, with an overall friction output that is required to produce a desired creeping moment is variably distributed to the two shifting components, wherein the distribution of the overall friction output to the two shifting components is performed using a rotational speed control of the electric motor, by means of which the power dissipating moment of the shifting components, which are correlated with the individual frictional moments, are set, with the electrical motor speed ($n_{EM}$) is varied in a speed range between a transmission input speed ($n_{GE}$) as a lower limit, and a combustible engine speed ($n_{VM}$) as an upper limit.

7. The apparatus according to claim 6, characterized in that the second shifting component is designed as a clutch.

8. The apparatus according to claim 6, characterized in that the second shifting component is designed as a clutch or switching brake inside the transmission.

9. The apparatus according to claim 6, characterized in that the second shifting component is designed as a transmission that is designed as two clutches or a transmission with at least switching brakes of a planetary gear train with multiple planetary gears sets.

* * * * *

UNITED STATES PATENT AND TRADEMARK OFFICE
CERTIFICATE OF CORRECTION

PATENT NO. : 8,475,331 B2  Page 1 of 1
APPLICATION NO. : 12/808638
DATED : July 2, 2013
INVENTOR(S) : Kaltenbach et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 512 days.

Signed and Sealed this
Eighth Day of September, 2015

Michelle K. Lee
*Director of the United States Patent and Trademark Office*